Aug. 18, 1925.
C. L. JOHNSON
SPLIT BALL FOR GEAR SHIFT LEVERS
Filed July 20, 1923
1,550,029
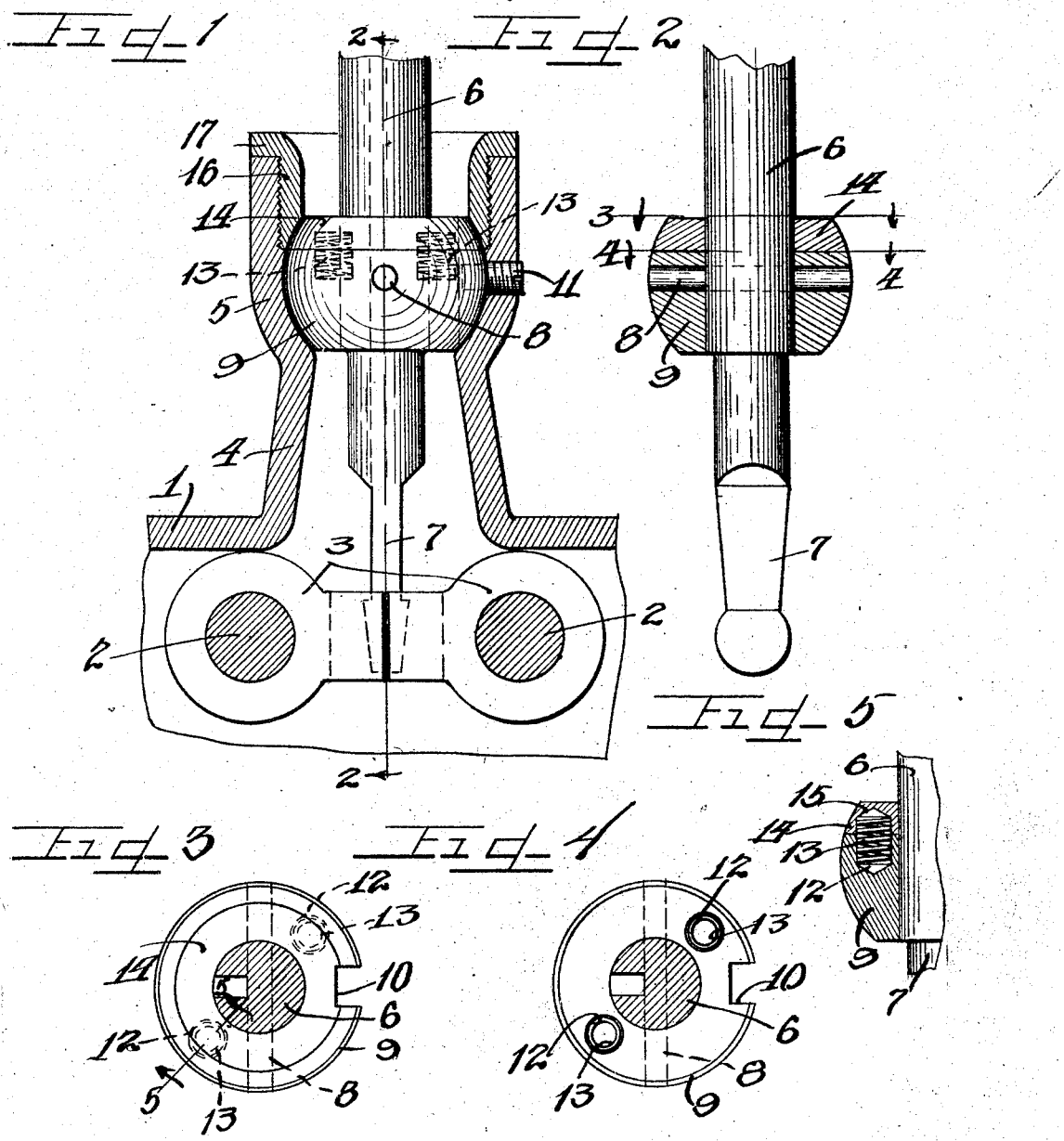

Patented Aug. 18, 1925.

1,550,029

UNITED STATES PATENT OFFICE.

COLVIN L. JOHNSON, OF ST. LOUIS, MISSOURI, ASSIGNOR TO JOHNSON AUTOMOBILE LOCK CO., A CORPORATION OF ILLINOIS.

SPLIT BALL FOR GEAR-SHIFT LEVERS.

Application filed July 20, 1923. Serial No. 652,782.

*To all whom it may concern:*

Be it known that I, COLVIN L. JOHNSON, a citizen of the United States, and a resident of the city of St. Louis, in the county of St. Louis and State of Missouri, have invented certain new and useful Improvements in a Split Ball for Gear-Shift Levers; and I hereby declare that the following is a full, clear, and exact description of the same, reference being had to the accompanying drawings, and to the numerals of reference marked thereon, which form a part of this specification.

This invention relates to a gear shift lever having mounted thereon a split pivot ball wherein springs are disposed for the purpose of taking up wear and for holding said lever rigid.

It is an object of this invention to provide a gear shift lever with a split pivot ball member.

It is also an object of the invention to provide a gear shift lever with a ball made up of a plurality of sections enclosing springs which act to separate the ball sections so that they will frictionally seat against the walls of a supporting socket to hold the gear shift lever rigidly in position.

It is an important object of this invention to provide a gear shift lever with a ball member constructed to automatically compensate for wear between the ball member and its supporting socket.

Other and further important objects of this invention will be apparent from the disclosures in the specification and accompanying drawings.

This invention (in a preferred form) is illustrated in the drawings and hereinafter more fully described.

On the drawings:

Figure 1 is a fragmentary vertical section through the gear shift lever supporting socket of a transmission mechanism showing the lower portion of a gear shift lever in elevation and equipped with an improved split ball member embodying the principles of this invention.

Figure 2 is a sectional view taken on line 2—2 of Fig. 1 showing the lever in elevation.

Figure 3 is a sectional view taken on line 3—3 of Fig. 2.

Figure 4 is a transverse section taken on line 4—4 of Figure 2.

Figure 5 is a detail section taken on line 5—5 of Fig. 3.

As shown on the drawings:

The reference numeral 1 indicates the cover plate of an automobile transmission housing within which are mounted a pair of slidable shift rods 2 having notched gear shift blocks 3 mounted thereon in the ordinary manner. Integrally formed on the cover plate 1 is an upright hollow pedestal 4 having an open socket 5 integrally formed on the upper end thereof. Projecting through the socket 5 is a gear shift lever 6 the lower end of which is of reduced diameter and shaped to afford a tail piece 7 the tip of which projects between the notched blocks 3 on the shifter rods 2.

Rigidly secured on the gear shift lever 6 by means of a transverse pin 8 is a lower or major ball section 9 which seats in the socket 5 to hold the gear shift lever 6 supported in position. The lower ball section 9 is provided with a slot or cut 10 to receive the inner end of a set screw 11 supported in the socket 5 to hold the ball section 9 and the gear shift lever 6 against rotation but permitting rocking or shifting thereof. The top of the lower ball section 9 is provided with two drillings or recesses 12 disposed diametrically opposite one another and each having seated therein a coiled spring 13.

Slidably engaged on the gear shift lever 6 above the lower ball section 9 is an upper smaller ball section 14 which is adapted to seat on the lower ball section 9 to form the ball member of the gear shift lever. The bottom of the upper ball section 14 is provided with two recesses 15 to receive the coiled springs 13. The inner periphery of the upper portion of the socket 5 is threaded to receive a threaded retaining sleeve 16 having an outwardly projecting flange 17 which seats against the top of the socket 5. The lower end of the retaining sleeve 16 is beveled complemental to the shape of the outer periphery of the upper ball section 14. The springs 13 within the ball member act to expand the ball member and resiliently hold the upper ball section 14 against the beveled surface of the retaining sleeve 16. The expansible ball member serves to hold the gear shift lever 6 in a rigid position and furthermore acts to compensate for wear between the ball member and the socket.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A gear shift mechanism comprising a lever, a lower ball section rigidly secured thereon and having recesses therein, an upper ball section slidable on said lever and having recesses therein positioned to register with the recesses in said lower ball section, and coiled springs seated in the recesses of said lower ball section and projecting into the recesses of the upper ball section.

2. The combination with a gear shift lever, of a supporting socket therefor, a ball section rigidly secured to said lever and seated in said socket, a second ball section movable on said lever, a retaining member secured in said socket to retain the movable ball section in place, and resilient means between said ball sections adapted to resiliently hold the movable ball section against said retaining member.

3. A gear shift mechanism comprising a lever, a recessed ball section rigidly secured thereon, a recessed ball section slidable on said lever, said lever extending through said sections, and springs engaged in the recesses of said sections to hold the same expanded.

In testimony whereof I have hereunto subscribed my name.

COLVIN L. JOHNSON.